(12) United States Patent
Kwak et al.

(10) Patent No.: US 8,055,263 B2
(45) Date of Patent: Nov. 8, 2011

(54) FAST CELL SELECTION METHOD AND APPARATUS FOR HIGH SPEED DOWNLINK PACKET ACCESS SYSTEM

(75) Inventors: No-Jun Kwak, Seoul (KR); Gert Jan Van Lieshout, Middlesex (KR); Himke Van Der Velde, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 11/540,963

(22) Filed: Oct. 2, 2006

(65) Prior Publication Data

US 2007/0109986 A1    May 17, 2007

(30) Foreign Application Priority Data

Oct. 5, 2005    (KR) .................. 10-2005-0093616

(51) Int. Cl.
    *H04Q 7/20*    (2006.01)
(52) U.S. Cl. .................. 455/436; 370/316; 370/351
(58) Field of Classification Search .................. 455/443
    See application file for complete search history.

(56) References Cited

U.S. PATENT DOCUMENTS

| 6,717,927 | B2 | 4/2004 | Chao et al. | |
|---|---|---|---|---|
| 2004/0192313 | A1* | 9/2004 | Otting | 455/446 |
| 2005/0117524 | A1 | 6/2005 | Lee et al. | |
| 2005/0192027 | A1 | 9/2005 | Kim et al. | |
| 2005/0207374 | A1* | 9/2005 | Petrovic et al. | 370/331 |
| 2005/0221824 | A1* | 10/2005 | Lee et al. | 455/435.2 |
| 2006/0007862 | A1* | 1/2006 | Sayeedi et al. | 370/235 |
| 2006/0094433 | A1* | 5/2006 | Cheng et al. | 455/439 |
| 2006/0104229 | A1* | 5/2006 | Vannithamby | 370/328 |

(Continued)

FOREIGN PATENT DOCUMENTS

DE    10001608 A1    7/2001

(Continued)

OTHER PUBLICATIONS

3GPP TSG RAN Meeting #27, HSDPA Mobility Enhancement Solution to Support Real-Time Delay Sensitive Services, Cingular Wireless, Lucent Technologies, Tokyo, Japan, Mar. 9-12, 2005.

*Primary Examiner* — Dwayne Bost
*Assistant Examiner* — Joseph Dean, Jr.
(74) *Attorney, Agent, or Firm* — Roylance, Abrams, Berdo & Goodman, L.L.P.

(57) ABSTRACT

A cell setting apparatus is provided for scheduling a packet data service in a mobile communication system supporting the packet data service. A signaling receiver receives information on a cell to be added to an active set and information on a change in a best cell, from a terminal. A signaling transmitter transmits configuration information for the packet data service and the packet data to a source base station or a target base station. A memory stores information on the active set. A data path decision unit allows the terminal to update the active set and to set configuration information newly set for the packet data service, transmits the information on the cell to be added to the active set to the target base station in response to the information on the cell to be added to the active set, and allows the target base station to perform the packet data service scheduling for the terminal in response to the information on the change in the best cell.

32 Claims, 10 Drawing Sheets

U.S. PATENT DOCUMENTS

| | | | |
|---|---|---|---|
| 2006/0223535 A1* | 10/2006 | Das et al. | 455/436 |
| 2006/0240831 A1* | 10/2006 | Toskala et al. | 455/436 |
| 2006/0256745 A1* | 11/2006 | Chao et al. | 370/295 |

FOREIGN PATENT DOCUMENTS

| | | |
|---|---|---|
| KR | 1020020096956 | 12/2002 |
| KR | 1020030079632 | 10/2003 |
| KR | 1020040068065 | 7/2004 |
| WO | WO 99/41925 A1 | 8/1999 |
| WO | WO03088695 | 10/2003 |
| WO | WO03088545 | 4/2004 |
| WO | WO 2005/125260 A1 | 12/2005 |

* cited by examiner

FAST CELL SELECTION METHOD AND APPARATUS FOR HIGH SPEED DOWNLINK PACKET ACCESS SYSTEM

CROSS REFERENCE TO RELATED APPLICATIONS

This application claims the benefit under 35 U.S.C. §119(a) of a Korean patent application entitled "Fast Cell Selection Method and Apparatus for High Speed Downlink Packet Access System" filed in the Korean Intellectual Property Office on Oct. 5, 2005 and assigned Serial No. 2005-93616, the entire contents of which are hereby incorporated by reference.

BACKGROUND OF THE INVENTION

1. Field of the Invention

The present invention relates to a method and apparatus for allowing a target cell to most efficiently perform scheduling on packet data service when a serving cell for the packet data service changes from a source cell to a target cell in a mobile communication system supporting packet data service. In addition, the present invention also relates to a fast cell selection method and apparatus for High Speed Downlink Packet Access (HSDPA) used in a Wideband Code Division Multiple Access (WCDMA) system. More particularly, the present invention relates to a method and apparatus for allowing a target cell to rapidly perform HSDPA scheduling when an HSDPA serving cell changes from a source cell to a target cell.

2. Description of the Related Art

A mobile communication system has been developed from an early communication system that provides voice service into a high-speed, high-quality wireless data packet communication system that provides data service and multimedia service. The $3^{rd}$ Generation (3G) mobile communication system, which is currently divided into $3^{rd}$ Generation Partnership Project (3GPP) and $3^{rd}$ Generation Partnership Project 2 (3GPP2), is now under standardization for high-speed, high-quality wireless data packet service. For example, standardization for HSDPA is being conducted in 3GPP, and under standardization for 1xEV-DV is being carried out in 3GPP2. Such standardization can be considered as an attempt to find a solution for high-speed, high-quality wireless data packet transmission service at 2 Mbps or higher in the 3G mobile communication system, and the $4^{th}$ Generation (4G) mobile communication system aims at providing the high-speed, high-quality multimedia service.

Generally, the HSDPA scheme refers to a scheme for transmitting control information and packet data through a High Speed Dedicated Shared Channel (HS-DSCH), which is a downlink channel for supporting high-speed packet data transmission, in an asynchronous Universal Mobile Terrestrial System (UMTS) mobile communication system.

HSDPA needs an advanced technology which is capable of increasing adaptability to the channel variation in addition to the conventional technology provided in the existing mobile communication system.

Therefore, Adaptive Modulation and Coding (AMC) and Hybrid Automatic Re-transmission Request (HARQ) for supporting high-speed packet transmission have been proposed in HSDPA.

FIG. 1 is a diagram illustrating a process of performing conventional HSDPA serving cell change which uses a Radio Network System Application Part (RNSAP) protocol and a Node B Application Part (NBAP) protocol of WCDMA.

In step 110, a User Equipment (UE) 101 is receiving HSDPA data from a source Node B 102. In step 115, the UE 101 notifies a Serving Radio Network Controller (SRNC) 104 of the fact that a new cell should be added to an active set as a result of monitoring a pilot channel and the like (such an event is called "EVENT 1A" in WCDMA), using an RRC MEASUREMENT REPORT procedure. If the active set is changed, the SRNC 104 sends to the UE 101 a command to change the active set in step 120. Upon receipt of the command, the UE 101 updates the active set and adds the resulting radio link (RL) in step 125, and then proceeds to step 130 where it notifies the SRNC 104 that active set update is completed.

In step 135, the UE 101 notifies the SRNC 104 of the fact that the best cell among the cells included in the active set is changed as a result of monitoring a pilot channel and the like (such an event is called "EVENT 1D" in WCDMA), using an RRC MEASUREMENT REPORT procedure.

Upon recognizing the change in the best cell, the SRNC 104 delivers the information required by a Node B to schedule a UE, such as buffer information, to a target Node B 103 and receives information on the HSDPA resource allocated from the target Node B 103 in step 140, in order to allow HSDPA service to be performed in a new best cell. Step 145 corresponds to a step of instructing the old cell to perform no more HSDPA scheduling. Step 140 and step 145 both use a Synchronous Radio Link Reconfiguration procedure.

In step 150, the SRNC 104 sends to the UE 101 a RADIO BEARER (RB) RECONFIGURATION message with HSDPA configuration information in the new cell. Upon receipt of the RADIO BEARER RECONFIGURATION message from the SRNC 104, the UE 101 delivers an RB RECONFIGURATION COMPLETE message in response thereto to notify the SRNC 104 of correct receipt of the new HSDPA configuration information. Upon receipt of the RB RECONFIGURATION message, the UE 101 monitors High Speed Shared Control Channels (HS-SCCHs) transmitted from the new cell beginning at the arrival of a Connection Frame Number (CFN) included in the message in step 155, to determine whether there is any HSDPA data transmitted thereto.

Because the SRNC 140 used the Synchronous Radio Link Reconfiguration procedure in step 140 and step 145, it sends RL RECONFIGURATION COMMIT messages to the source Node B 102 and the target Node B 103 in step 160, so as to stop HSDPA scheduling in the source cell 102, or the old serving cell, and to start HSDPA scheduling in the target cell 103, or the new serving cell. From now on, the SRNC 140 changes its HSDPA data path from the source Node B 102 to the target Node B 103. Thereafter, the target Node B 103 starts scheduling on the UE 101 in step 165 and step 170.

It can be noted from the foregoing process that there is a considerable time difference between the time where the best cell was changed in step 135 and the time where HSDPA data is actually transmitted from the new best cell 103 in step 165. This problem may be relived to some extent with the use of a method proposed in the present invention in which HSDPA configuration is previously prepared in the target Node B. In addition, it is possible to facilitate fast HSDPA serving cell change by improving the Synchronous Radio Link Reconfiguration procedure performed in the foregoing process.

In the foregoing conventional Synchronous Radio Link Reconfiguration procedure, as the Synchronous Radio Link Reconfiguration procedure commonly defined in RNSAP and NBAP, an SRNC (or Controlling RNC (CRNC)) transmits new radio link configuration information to a Drift RNC (DRNC) (or Node B) along with an RL RECONFIGURA- TION PREPARE message. Upon receipt of the RL RECONFIGURATION PREPARE message, the DRNC (or Node B) transmits an RL RECONFIGURATION READY message in response thereto to the SRNC (or CRNC) and at the same time, stores the radio link configuration information. Thereafter, upon receipt of the RL RECONFIGURATION COMMIT message for requesting commitment of radio link configuration, the DRNC commits the radio link configuration according to a connection frame number (CFN) included in the received message if the current CFN is equal to the CFN included in the received message.

Currently, because the RL RECONFIGURATION COMMIT message should necessarily include the CFN as shown in Table 1 below, the SRNC delivers this message to the Node B after the best cell is changed, and the new cell performs HSDPA scheduling after a lapse of a predetermined time taking the CFN into account.

TABLE 1

| IE/ Group Name | Presence | Range | IE Type and Reference | Semantics Description | Criticality | Assigned Criticality |
|---|---|---|---|---|---|---|
| Message Type | M | | | | YES | ignore |
| Transaction ID | M | | | | — | |
| CFN | M | | | | YES | ignore |
| Active Pattern Sequence Information | O | | | FDD only | YES | ignore |

SUMMARY OF THE INVENTION

Accordingly, the present invention has been made to address at least the above problems and/or disadvantages, and an object of the present invention is to provide a method and apparatus for allowing a best cell newly selected using a fast cell selection method to efficiently transmit packet data in a mobile communication system supporting packet data service.

According to one aspect of the present invention, a cell setting method for scheduling a packet data service in a mobile communication system supporting the packet data service is provided. The method includes receiving information on a cell to be added to an active set from a terminal. In response to the information on the cell to be added to the active set, configuration information is transmitted for the packet data service to a target base station and the target base station is allowed to establish a radio link. The terminal is allowed to update the active set, and to set configuration information for the packet data service. Information on a change in a best cell from the terminal is received. In response to the information on the change in the best cell, the target base station is allowed to perform packet data service scheduling for the terminal, and a source base station is allowed to stop the packet data service scheduling for the terminal.

According to another aspect of the present invention, a method for receiving a packet data service by a terminal in a mobile communication system supporting the packet data service is provided. The method includes transmitting information on a cell to be added to an active set to a serving RNC. The active set is updated according to control of the serving RNC, and configuration information for the packet data service is re-set. Information on a change in a best cell to the serving RNC is transmitted. Scheduling information for the packet data service from both a source base station and a target base station is monitored essentially simultaneously. The packet data service from the target base station is received, if the target base station performs scheduling on the packet data service according to control of the serving RNC.

According to further another aspect of the present invention, a cell setting apparatus for scheduling a packet data service in a mobile communication system supporting the packet data service is provided. The apparatus includes a signaling receiver for receiving information on a cell to be added to an active set and information on a change in a best cell, from a terminal. A signaling transmitter transmits configuration information for the packet data service and the packet data to a source base station or a target base station. A memory stores information on the active set. A data path decision unit allows the terminal to update the active set and to set configuration information newly set for the packet data service, transmits the information on the cell to be added to the active set to the target base station in response to the information on the cell to be added to the active set, and allows the target base station to perform the packet data service scheduling for the terminal in response to the information on the change in the best cell.

According to yet another aspect of the present invention, an apparatus for receiving a packet data service in a mobile communication system supporting the packet data service is provided. The apparatus includes a signaling receiver for generating information on a cell to be added to an active set and information on a change in a best cell based on strengths of signals transmitted from a plurality of cells, simultaneously monitoring scheduling information for the packet data service from both a source base station and a target base station, and receiving the packet data service from the target base station, if the target base station performs scheduling on the packet data service according to control of a serving RNC. A signaling transmitter transmits the information on the cell to be added to the active set and the information on the change in the best cell, to the serving RNC. A memory updates the active set according to control of the serving RNC, and stores newly set configuration information for the packet data service.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

Figure 1:
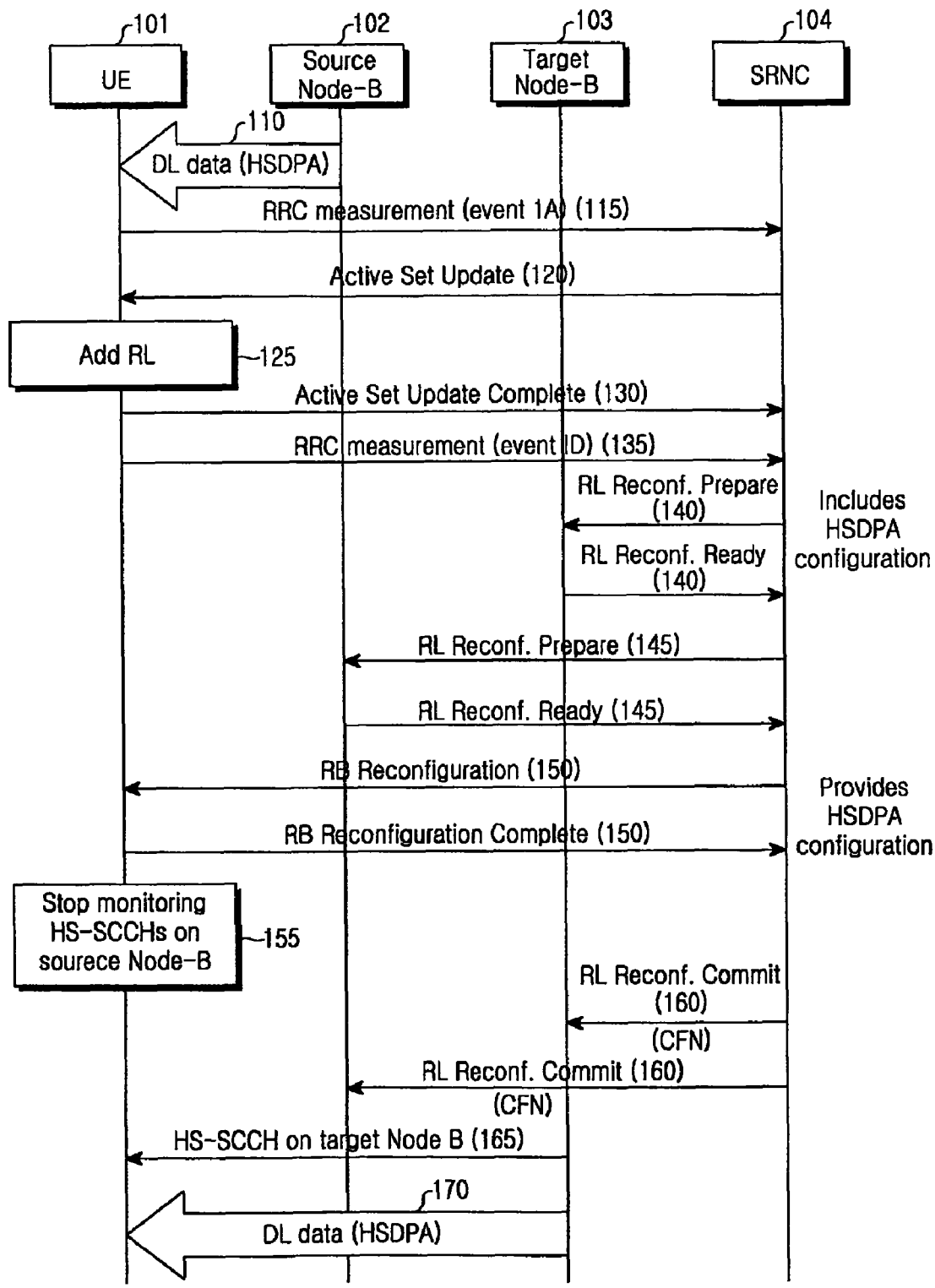
FIG. 1 is a diagram illustrating the conventional High Speed Downlink Packet Access (HSDPA) serving cell change procedure.

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention is based on the system of transmitting packet data, such as evolution Dara&Voice (EV-DV), Long Term Evolotion (LTE) Wideband Code Division Multiple Access (WCDMA) High Speed Downlink Packet Access (HSDPA). An exemplary embodiment of the present invention will be described herein with reference to a WCDMA HSDPA. In the annexed drawings and the following description, a Drift RNC (DRNC) is not separately specified in the situation where a Controlling RNC (CRNC) and a Serving Radio Network Controller (SRNC) of WCDMA are different. However, it may be noted that an RNSAP message transmitted from the SRNC to the DRNC is substantially equal to the Node B Application Part (NBAP) message transmitted from the SRNC to a Node B, specified in the drawings and the following description. It may also be noted that the proposed message format is shown herein in the form of the table used in $3^{rd}$ Generation Partnership Project (3GPP).

An exemplary implementation of a method for allowing a newly selected best cell to efficiently transmit packet data, if an SRNC previously configures HSDPA information in all cells belonging to an active set using a Fast Cell Select (FCS) scheme and then provides this information to a Node B managing the best cell in case of the change in the best cell, then the Node B performs HSDPA scheduling on the new best cell from now on.

The FCS scheme is a method for rapidly selecting the cell with a good channel state among a plurality of cells, when a UE using HSDPA is located in a cell overlapping area, such as soft handover region. For example, if the UE using HSDPA enters the cell overlapping area between the old Node B and the new Node B, the UE establishes radio links to a plurality of cells (or Node Bs). Herein, a set of the cells whose radio links are established to the UE is called an active set.

The UE receives packet data for HSDPA only from the cell maintaining the best channel state among the cells included in the active set, thereby reducing the overall interference. Herein, the cell maintaining the best channel state among the cells included in the active set is called a best cell. To this end, the UE periodically detects channel states of the cells belonging to the active set, to monitor whether there is any cell having a channel state better than that of current best cell.

If any cell having the better channel state exists, the UE transmits a best cell indicator and the like to the cells belonging to the active set. The best cell indicator is an indicator used for requesting a change in cell from the current best cell to the newly detected cell having the better channel state, and includes an identifier of the cell selected as the best cell. Then the cells in the active set receive the best cell indicator, and determine the cell identifier included in the best cell indicator. In this way, each of the cells in the active set determines whether the received best cell indicator is a best cell indicator mapped to the cell itself. As a result of the determination, the corresponding cell selected as the best cell transmits packet data to the UE using an HS-DSCH.

The operational principle of exemplary embodiments of the present invention will be described in detail hereinbelow.

First Exemplary Embodiment

A first exemplary embodiment of the present invention provides a method in which after an SRNC sends HSDPA-related radio link configuration information of a target cell to a Node B using an Asynchronous Radio Link Reconfiguration procedure, the Node B starts HSDPA scheduling beginning at the receipt of a new message for requesting the start of HSDPA scheduling from the SRNC. The first exemplary embodiment of the present invention uses the existing Synchronous Radio Link Reconfiguration procedure as a method for stopping HSDPA scheduling of a source cell.

Figure 2:
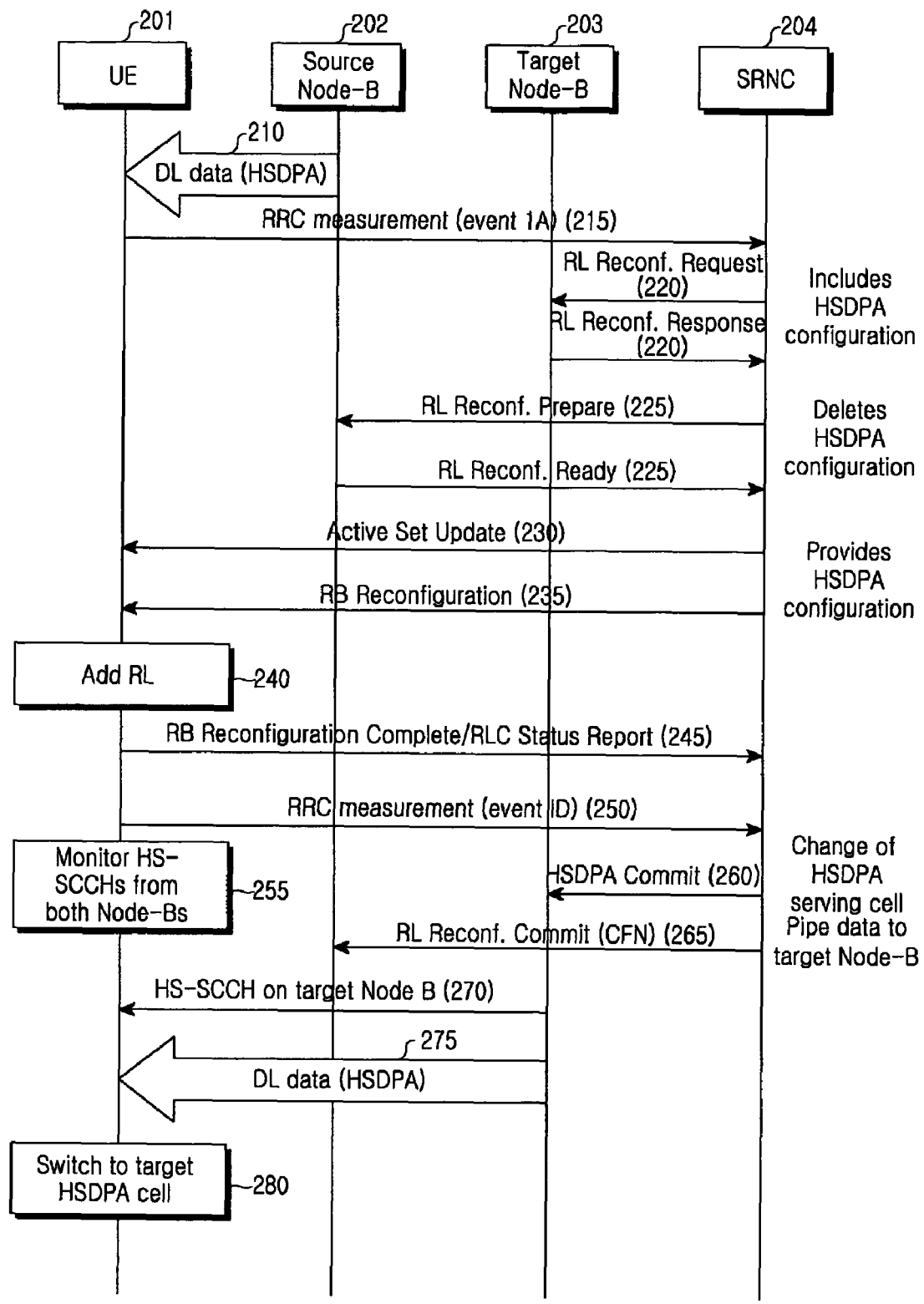
FIG. 2 is a signaling diagram according to a first exemplary embodiment of the present invention.

FIG. 2 is a signaling diagram according to a first exemplary embodiment of the present invention.

Referring to FIG. 2, a process in steps 210 to 245, which is a first aspect according to the first exemplary embodiment of the present invention, is a process of previously configuring HSDPA configuration information in a target Node B before an HSDPA serving cell is actually changed, and then providing the information to a UE.

Specifically, in step 210, a UE 201 is receiving HSDPA data from a source Node B 202. In step 215, the UE 201 informs an SRNC 204 of the fact that a new cell should be added to an active set as a result of monitoring a pilot channel and the like (such an event is called "EVENT 1A" in WCDMA), using an RRC MEASUREMENT REPORT procedure. In step 220, when a new cell is added to the active set, an Asynchronous Radio Link Reconfiguration procedure is used as a procedure for providing HSDPA configuration information of the new cell to a target Node B 203.

According to an exemplary implementation, the SRNC 204 transmits HSDPA configuration information to the target Node B 203 along with an RL RECONFIGURATION REQUEST message, and upon receipt of this message, the target Node B 203 sends an RL RECONFIGURATION RESPONSE message to the SRNC 204 in response thereto. Because the target Node B 203 is not yet receiving HSDPA data from the SRNC 204, it is not performing HSDPA scheduling on the UE 201. Step 225 corresponds to a process of instructing the source Node B 202, or the old HSDPA serving Node B, to prepare for deletion of HSDPA configuration information in case that an HSDPA serving cell will be changed later. The Synchronous Radio Link Reconfiguration procedure is used in this process.

In step 230, the SRNC 204 sends to the UE 201 a command for requesting a change in the active set. Upon receipt of this command, the UE 201 updates the active set and adds the resulting radio link in step 240. In step 235, the SRNC 204 provides HSDPA configuration information in the new cell to the UE 201. Upon receipt of a RADIO BEARER RECONFIGURATION message from the SRNC 204, the UE 201 sends an RB RECONFIGURATION COMPLETE message in response thereto in step 245, to notify the SRNC 204 of correct receipt of the new HSDPA configuration information.

Here, the UE 201 can provide the SRNC 204 with a state of the current radio link control (RLC) as well.

A process in steps 250 to 280, which is a second aspect according to the first exemplary embodiment of the present invention, is a process in which upon recognizing the change in the best cell, the SRNC 204 notifies this fact to the target Node B 203 and the source Node B 202, thereby to change the HSDPA serving cell. In this process, the target Node B 203 schedules the actual data to the UE 201 through an HSDPA channel using the HSDPA configuration information previously set in the first aspect.

In step 250, the UE 201 notifies the SRNC 204 of the fact that the best cell among the cells included in the active set is changed as a result of monitoring a pilot channel and the like (such an event is called "EVENT 1D" in WCDMA), using an RRC MEASUREMENT REPORT procedure. Thereafter, in step 255, the UE 201 starts monitoring High Speed Shared Control Channels (HS-SCCHs) transmitted from the source cell 202 and the target cell 203. In a process of steps 260 and 265, upon recognizing the change in the best cell from the RRC message of step 250, the SRNC 204 notifies this fact to the source Node B 202 and the target Node B 203 to change the HSDPA serving cell. For example, in step 260, the SRNC 204 sends new NBAP and RNSAP messages to the target Node B 203 to the target Node B 203 that it should perform HSDPA scheduling because HSDPA data will soon arrive at the target Node B 203.

In FIG. 2, a new so-called HSDPA COMMIT message is used as the NBAP and RNSAP messages, by way of example. In step 265, the SRNC 204 stops the HSDPA scheduling in the source cell 202 using the existing RL RECONFIGURATION COMMIT message, because the Synchronous Radio Link Reconfiguration procedure was used in step 255. Table 2 shows an exemplary HSDPA COMMIT message used in step 260.

TABLE 2

| IE/Group Name | Presence | Range | IE Type and Reference | Semantics Description | Criticality | Assigned Criticality |
|---|---|---|---|---|---|---|
| Message Discriminator | M | | | | — | |
| Message type | M | | | | YES | ignore |
| Transaction ID | M | | | | — | |
| Node B Communication Context ID | M | | | The reserved value "All NBCC" shall not be used. | YES | ignore |

While sending the HSDPA COMMIT message to the target Node B 203 in step 260, the SRNC 204 sends the HSDPA data targeting the UE 201 to the target Node B 203 rather than the source Node B 202. Upon receipt of the HSDPA COMMIT message in step 260, the target Node B 203 immediately performs HSDPA scheduling from now on. That is, step 270 corresponds to a process in which the target Node B 203 delivers the scheduling information to the UE 201 through an HS-SCCH. In step 275, the target Node B 203 actually transmits HSDPA data to the UE 201 according to the scheduling. In step 280, the UE 201 monitors the HS-SCCH from only the target cell from the time when it recognized the fact that its own ID is included in the HS-SCCH received in step 270. In this way, the overall HSDPA serving cell change (or overall HSDPA serving cell switching) is completed.

Figure 3:
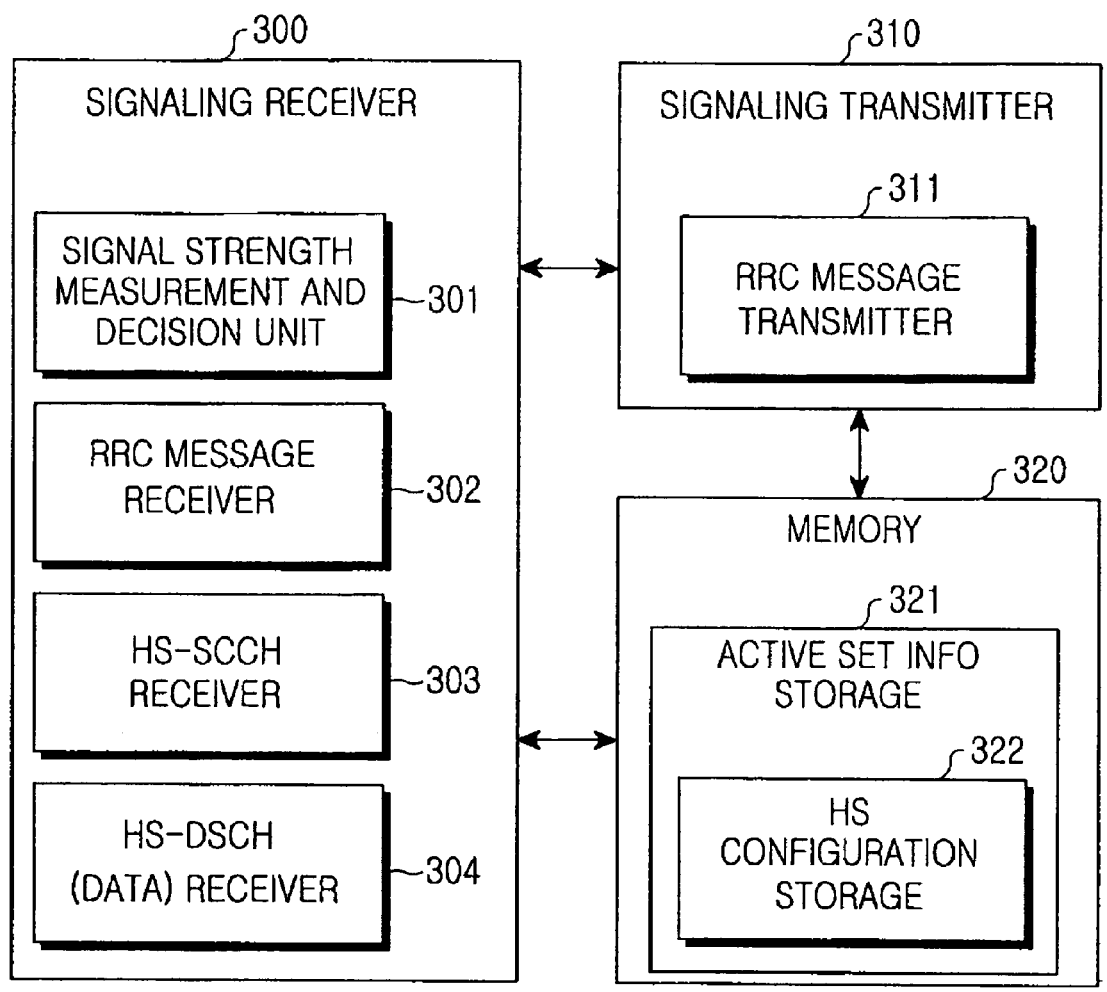
FIG. 3 is a diagram illustrating a brief structure of a User Equipment (UE) according to an exemplary embodiment of the present invention.

FIG. 3 is a diagram illustrating a brief structure of a UE according to an exemplary embodiment of the present invention.

Referring to FIG. 3, a signaling receiver 300 receives various signals and messages transmitted from an RNC or a Node B. The signaling receiver 300 includes a signal strength measurement and decision unit 301 for receiving a pilot channel and measuring strength thereof, an RRC message receiver 302 for receiving a message from an RNC, an HS-SCCH receiver 303 for receiving HSDPA scheduling information of a Node B, and an HS-DSCH receiver 304 for actually receiving HSDPA data. A signaling transmitter 310 monitors a pilot channel and the like and notifies EVENT ID to an SRNC using an RRC MEASUREMENT REPORT procedure in step 250 of FIG. 2. In the signaling receiver 300, the HS-SCCH receiver 303 simultaneously monitors HS-SCCHs transmitted from a source cell 202 and a target cell 203 as shown in step 255 of FIG. 2. The signaling transmitter 310, a part for transmitting signaling to an RNC, includes an RRC message transmitter 311 for transmitting a novel RRC message proposed in an exemplary embodiment of the present invention to an RNC. A memory 320 includes an active set information storage 321 for storing information on an active set, and the active set information storage 321 includes an HS configuration storage 322 for storing an HSDPA configuration set in each cell. The memory 320 can simultaneously store HSDPA configuration information from both the target Node B 203 and the source Node B 204 of FIG. 2. The signaling transmitter 310, the signaling receiver 300, and the memory 320, being interconnected to one another, perform the operation of FIG. 2.

Figure 4:
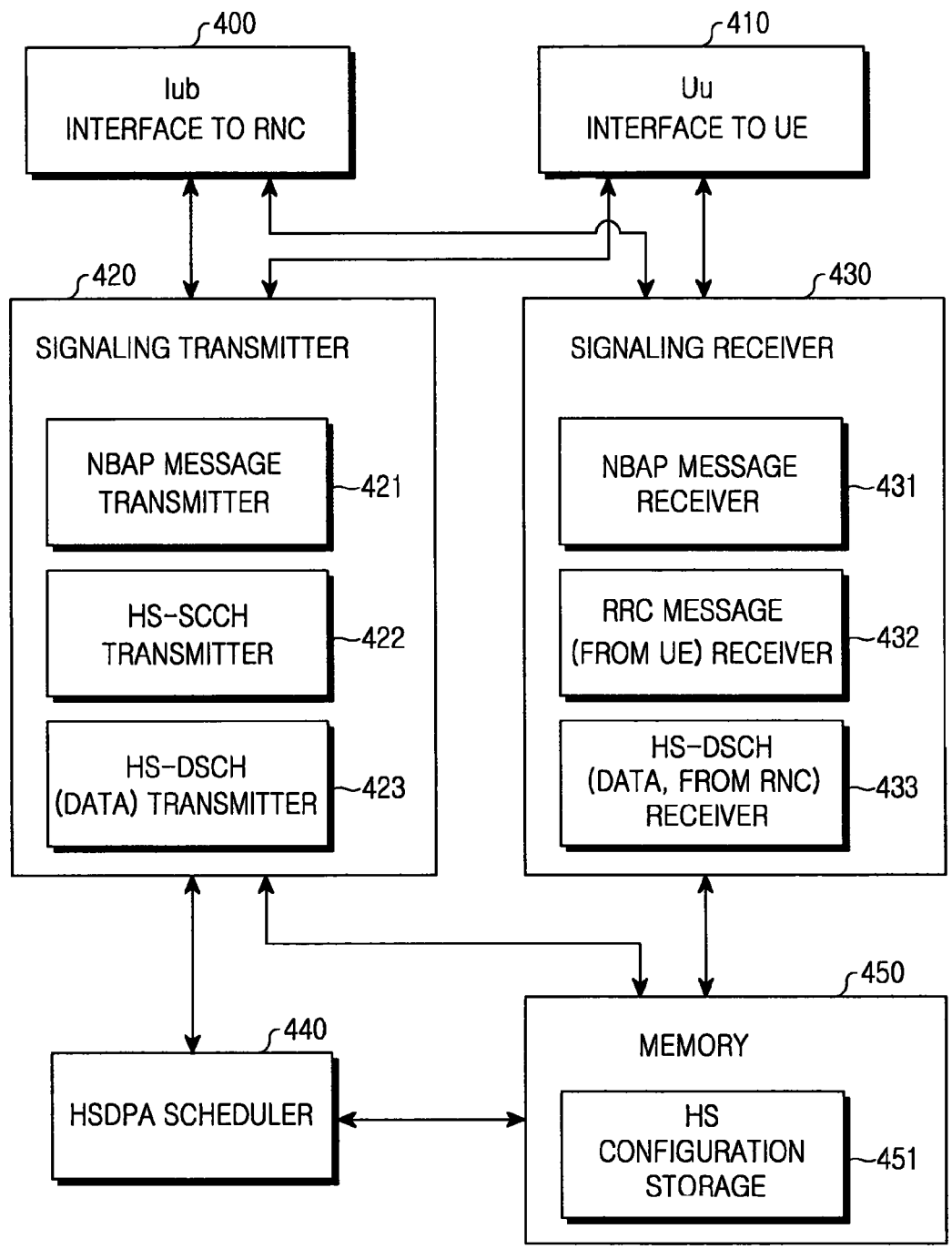
FIG. 4 is a diagram illustrating a structure of a Node B according to an exemplary embodiment of the present invention.

FIG. 4 is a diagram illustrating a structure of a Node B according to an exemplary embodiment of the present invention.

Referring to FIG. 4, a Node B includes an Iub interface 400 to an RNC, a Uu interface 410 to a UE, a signaling transmitter 420, a signaling receiver 430, a memory 450, and an HSDPA scheduler 440. The signaling transmitter 420 and the signaling receiver 430 are each connected to the Iub interface 400 and the Uu interface 410, and take charge of data exchange. The signaling transmitter 420 includes an NBAP message transmitter 421, an HS-SCCH transmitter 422, and an HS-DSCH transmitter 423, and the signaling receiver 430 includes an NBAP message receiver 431, an RRC message receiver 432 and an HS-DSCH receiver 433. The memory 450 includes an HS configuration storage 451 for storing HSDPA configuration information. The HSDPA scheduler 440 immediately performs HSDPA scheduling upon receipt of an HSDPA COMMIT message in step 260 of FIG. 2. In addition, the HSDPA scheduler 440 has a function of performing HSDPA scheduling, such as a function of delivering the scheduling information in step 270 to a UE through an HS-SCCH.

Figure 5:
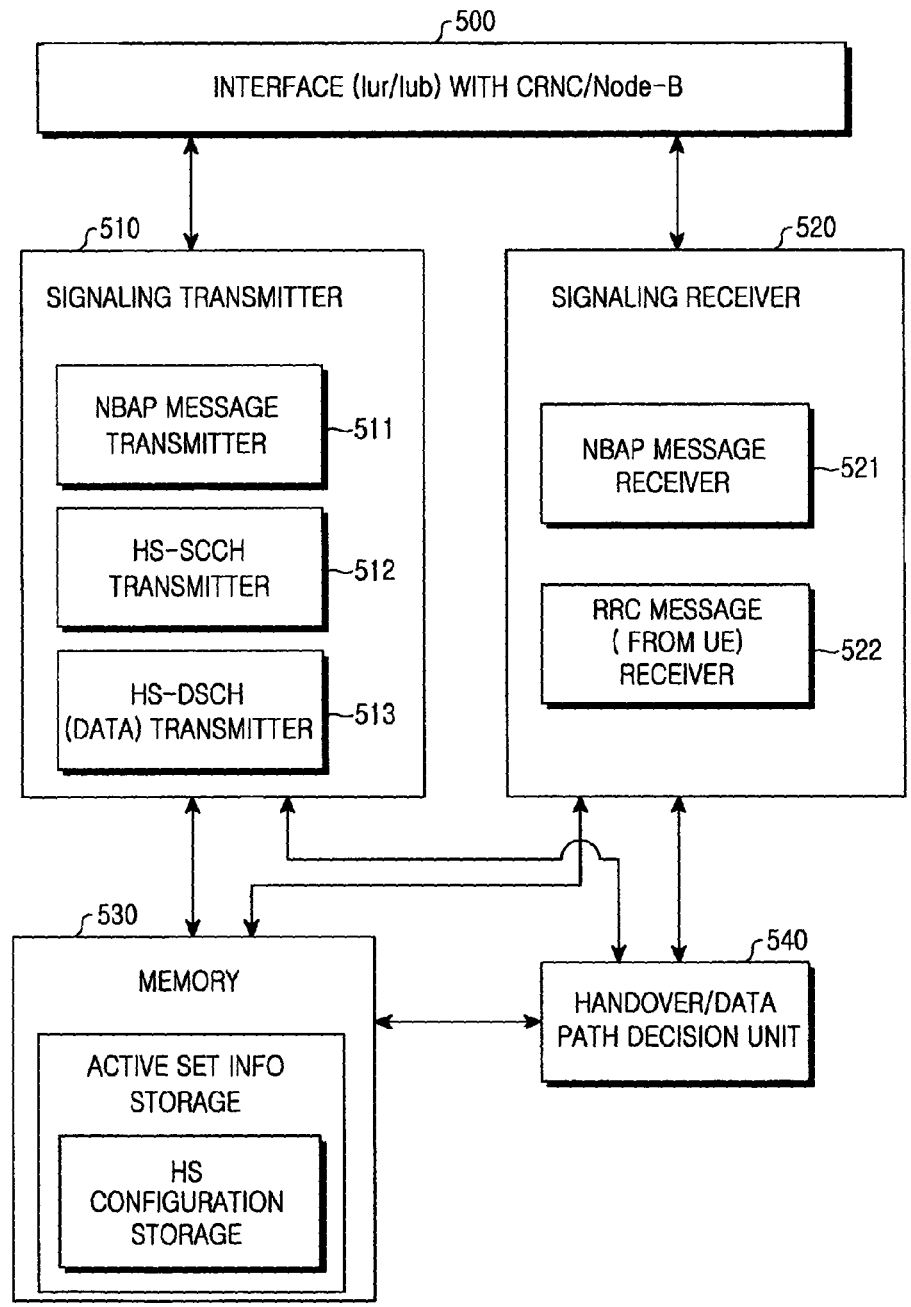
FIG. 5 is a diagram illustrating a structure of an Serving Radio Network Controller (SRNC) according to an exemplary embodiment of the present invention.

FIG. 5 is a diagram illustrating a structure of an SRNC according to an exemplary embodiment of the present invention.

Referring to FIG. 5, an SRNC includes an Iur/Iub interface 500 which is an interface to another RNC and a Node B, a signaling transmitter 510, a signaling receiver 520, a handover/data path decision unit 540, and a memory 530.

The signaling transmitter 510 includes an NBAP message transmitter 511, an RRC message transmitter 512, and an HS-DSCH transmitter 513, and the signaling receiver 520 includes an NBAP message receiver 521 and an RRC message receiver 522. The memory 530 includes an active set information storage 531 for storing information on an active set, and the active set information storage 531 includes an HS configuration storage 532 for storing an HSDPA configuration set in each cell.

As for handover decision and data path decision, the handover/data path decision unit 540 sends new NBAP and RNSAP messages to the target Node B 203 in step 260 of FIG. 2 taking into account the RRC MEASUREMENT REPORT received from the signaling receiver 520, to notify the target Node B 203 that it should perform HSDPA scheduling because HSDPA data will soon arrive at the target Node B 203. Here, a new so-called HSDPA COMMIT message is used as the NBAP and RNSAP messages in FIG. 2, by way of example.

Second Exemplary Embodiment

A second exemplary embodiment of the present invention, similarly to the first embodiment, provides a method in which after an SRNC sends HSDPA-related radio link configuration information of a target cell to a Node B using an Asynchronous Radio Link Reconfiguration procedure, the Node B starts HSDPA scheduling beginning at the receipt of a new message for requesting the start of HSDPA scheduling from the SRNC. While in an exemplary implementation of the first embodiment the stop of HSDPA scheduling is previously notified to a source cell as a method for stopping the HSDPA scheduling of the source cell, the second embodiment uses the Asynchronous Radio Link Reconfiguration procedure.

Figure 6:
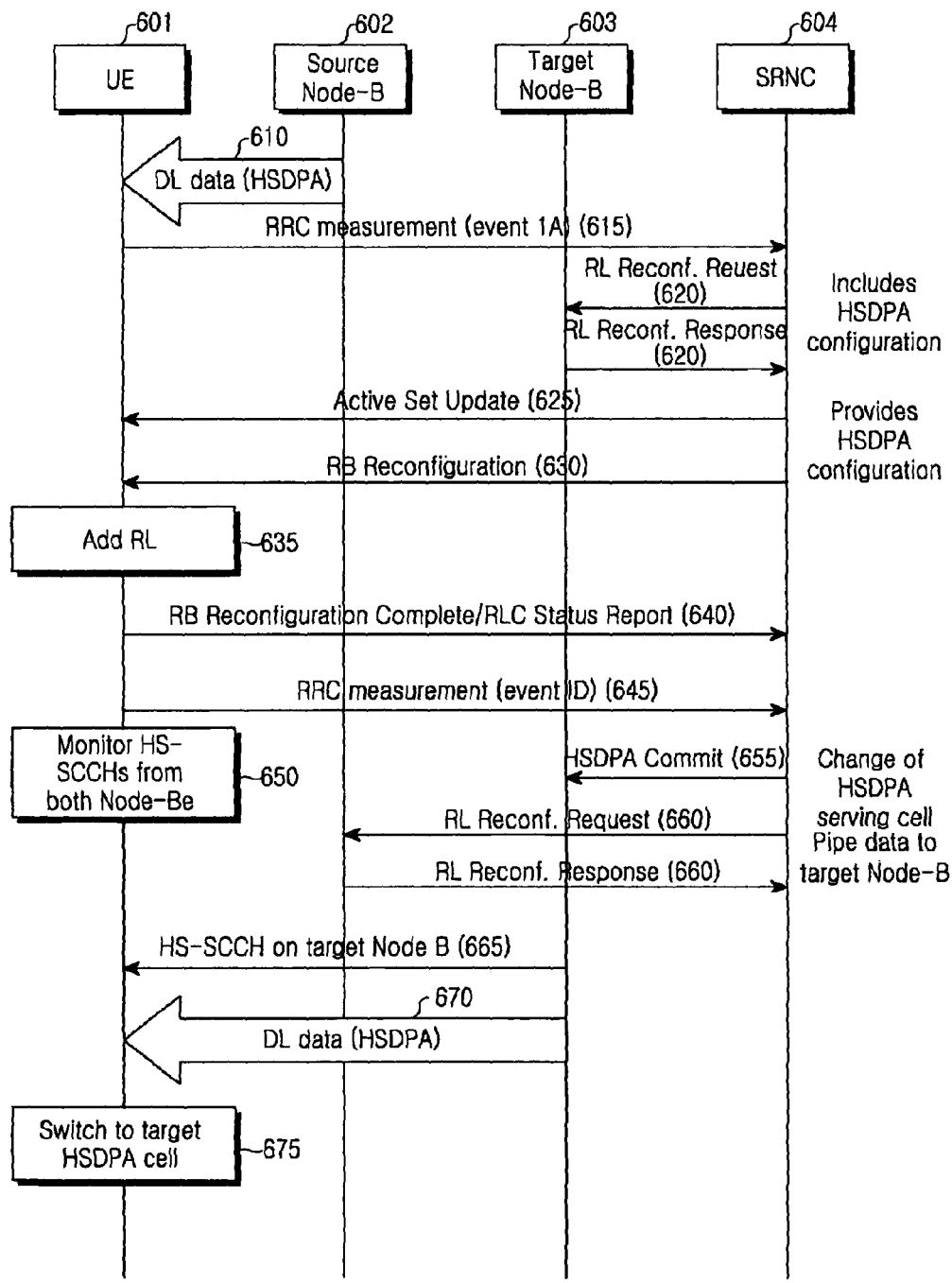
FIG. 6 is a signaling diagram according to a second exemplary embodiment of the present invention.

FIG. 6 is a signaling diagram according to a second exemplary embodiment of the present invention.

Referring to FIG. 6, a process in steps 610 to 640, which is a first aspect according to the second exemplary embodiment of the present invention, is a process of previously configuring HSDPA configuration information in a target Node B 603 before an HSDPA serving cell is actually changed, and then providing the information to a UE 601. In terms of this aspect, the second embodiment is different from the first embodiment in that step 255 of the first embodiment is skipped in the second embodiment. For example, while the first embodiment previously notifies the stop of HSDPA scheduling even to the source Node B 202 before the change in the best cell in preparation for the expected change in the serving cell in step 225, the second embodiment omits this process.

A process in steps 645 to 675, which is a second aspect according to the second exemplary embodiment of the present invention, is a process in which upon recognizing the change in the best cell, an SRNC 604 notifies this fact to a target Node B 603 and a source Node B 602, thereby to change the HSDPA serving cell. The target Node B 603 schedules actual data to the UE 601 through an HSDPA channel using the HSDPA configuration information previously set in the first aspect. In an exemplary implementation, the second embodiment is different from the first embodiment in that while the SRNC 204 sends an RL RECONFIGURATION COMMIT message indicating when it will commit the HSDPA scheduling stop previously notified through the Synchronous Radio Link Reconfiguration procedure in step 265, to the source Node B 202 in the first aspect in the first embodiment, an SRNC 604 notifies the HSDPA scheduling stop to the source Node B 602 using the Asynchronous Radio Link Reconfiguration procedure in step 660 in the second embodiment.

Upon receipt of the RL RECONFIGURATION REQUEST message in step 660, the source Node B 602 stops the HSDPA scheduling and sends an RL RECONFIGURATION RESPONSE message to the SRNC 604 in response thereto. The operations of the target Node B 603 and the UE 601 in the second embodiment are similar to those in the first embodiment, so a description thereof will be omitted.

Third Exemplary Embodiment

A third exemplary embodiment of the present invention, similar to the second embodiment, provides a method in which after an SRNC sends HSDPA-related radio link configuration information of a target cell to a Node B using an Asynchronous Radio Link Reconfiguration procedure, the Node B starts HSDPA scheduling beginning at the receipt of a new message for requesting the start of HSDPA scheduling from the SRNC. In addition, the third embodiment, similar to the second embodiment, sends a message for requesting stop of the HSDPA scheduling after the change in the best cell as a method for stopping HSDPA scheduling of the source cell. The third embodiment, unlike the second embodiment, stops the HSDPA scheduling of the source cell using a message configured in the same format as the message sent for requesting commitment of the HSDPA scheduling to the target cell, without using the Synchronous or Asynchronous Radio Link Reconfiguration procedure in the source cell.

Figure 7:
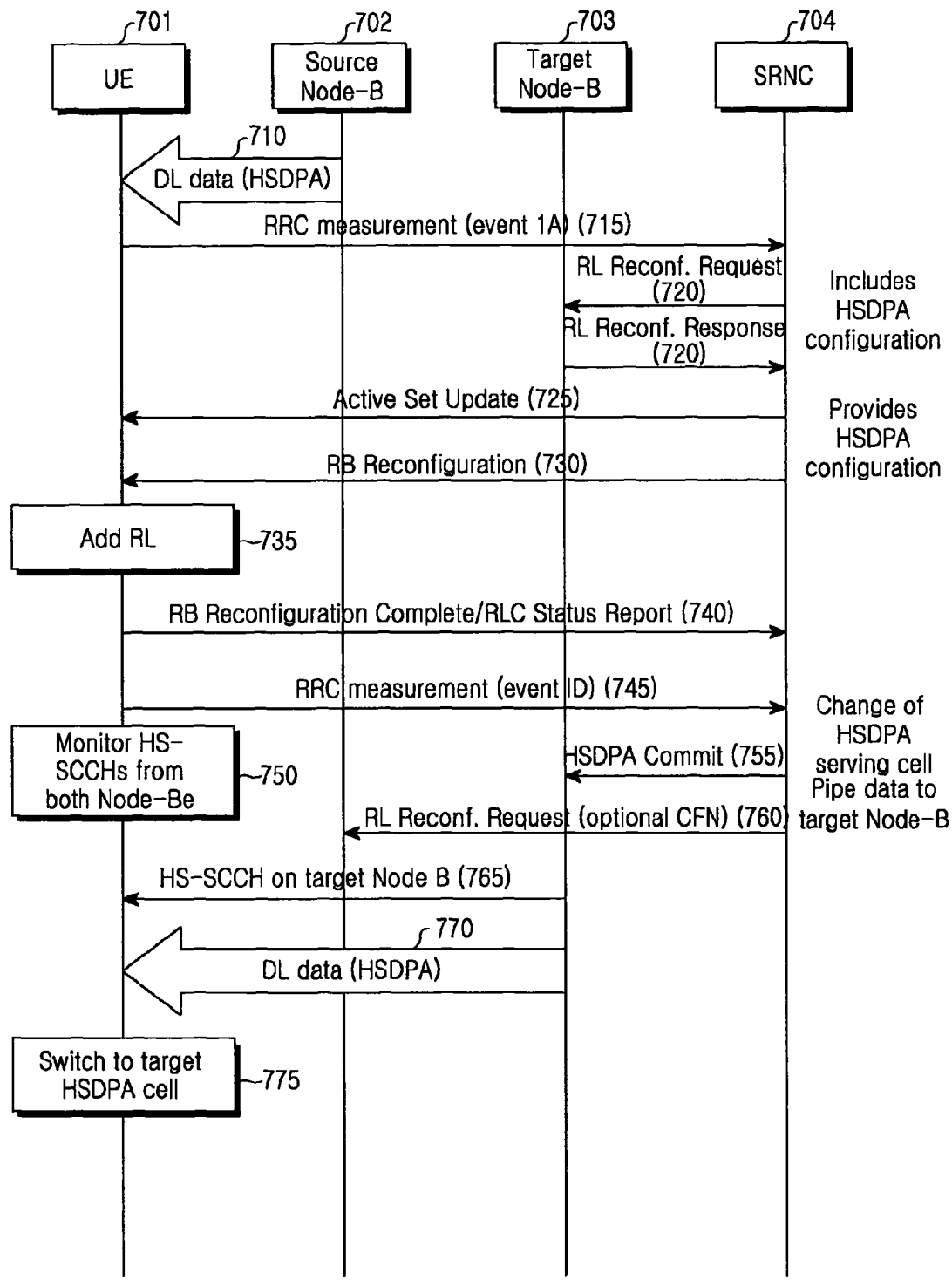
FIG. 7 is a signaling diagram illustrating according to a third exemplary embodiment of the present invention.

FIG. 7 is a signaling diagram illustrating according to a third exemplary embodiment of the present invention.

Referring to FIG. 7, a process in steps 710 to 740, which is a first aspect according to the third exemplary embodiment of the present invention, is a process of previously setting HSDPA configuration information in a target Node B before an HSDPA serving cell is actually changed, and then providing the information to a UE. This process is equal to the process in steps 610 to 640 in the second embodiment.

A process in steps 745 to 775, which is a second aspect according to the third exemplary embodiment of the present invention, is a process in which upon recognizing the change in the best cell, an SRNC 704 notifies this fact to a target Node B 703 and a source Node B 702, thereby to change the HSDPA serving cell. The target Node B 703 schedules actual data to the UE 701 through an HSDPA channel using the HSDPA configuration information previously set in the first aspect. In this process, the third embodiment is different from the second embodiment in that while the second embodiment notifies the stop of the HSDPA scheduling using the Asynchronous Radio Link Reconfiguration procedure in step 660, the third embodiment uses the message configured in the same format as the message sent for requesting commitment of the HSDPA scheduling from now on to the target Node B 703 in step 755.

Upon receipt of an HSDPA COMMIT message in step 760, the source Node B 702 stops the HSDPA scheduling. The operations of the target Node B 703 and the UE 701 in the third embodiment are equal to those in the first and second embodiments, so a description thereof will be omitted.

For example, because the HSDPA COMMIT message used in step 760 optionally has a separate CFN field as shown in Table 3, the source cell can stop the HSDPA scheduling after a lapse of a predetermined time.

TABLE 3

| IE/ Group Name | Presence | Range | IE Type and Reference | Semantics Description | Criticality | Assigned Criticality |
|---|---|---|---|---|---|---|
| Message Discriminator | M | | | | — | |
| Message type | M | | | | YES | ignore |
| Transaction ID | M | | | | — | |
| Node B | M | | | The | YES | ignore |

TABLE 3-continued

| IE/<br>Group Name | Pres-<br>ence | Range | IE Type<br>and Ref-<br>erence | Seman-<br>tics De-<br>scription | Criticality | Assigned<br>Critical-<br>ity |
|---|---|---|---|---|---|---|
| Communication Context ID | | | | reserved value "All NBCC" shall not be used. | | |
| CFN | 0 | | | | YES | ignore |

Fourth Exemplary Embodiment

A fourth exemplary embodiment of the present invention, unlike the first to third embodiments, provides a method in which after an SRNC sends HSDPA-related radio link configuration information of a target cell to a Node B using a Synchronous Radio Link Reconfiguration procedure, the Node B starts HSDPA scheduling beginning at the receipt of an RL RECONFIGURATION COMMIT message from the SRNC. However, unlike the existing Synchronous Radio Link Reconfiguration procedure, the new Synchronous Radio Link Reconfiguration procedure does not include CFN in the RL RECONFIGURATION COMMIT message in the fourth embodiment. Upon receipt of the RL RECONFIGURATION COMMIT message with no CNF, the Node B can immediately commit the new configuration received and stored from the RL RECONFIGURATION PREPARE message.

Figure 8:
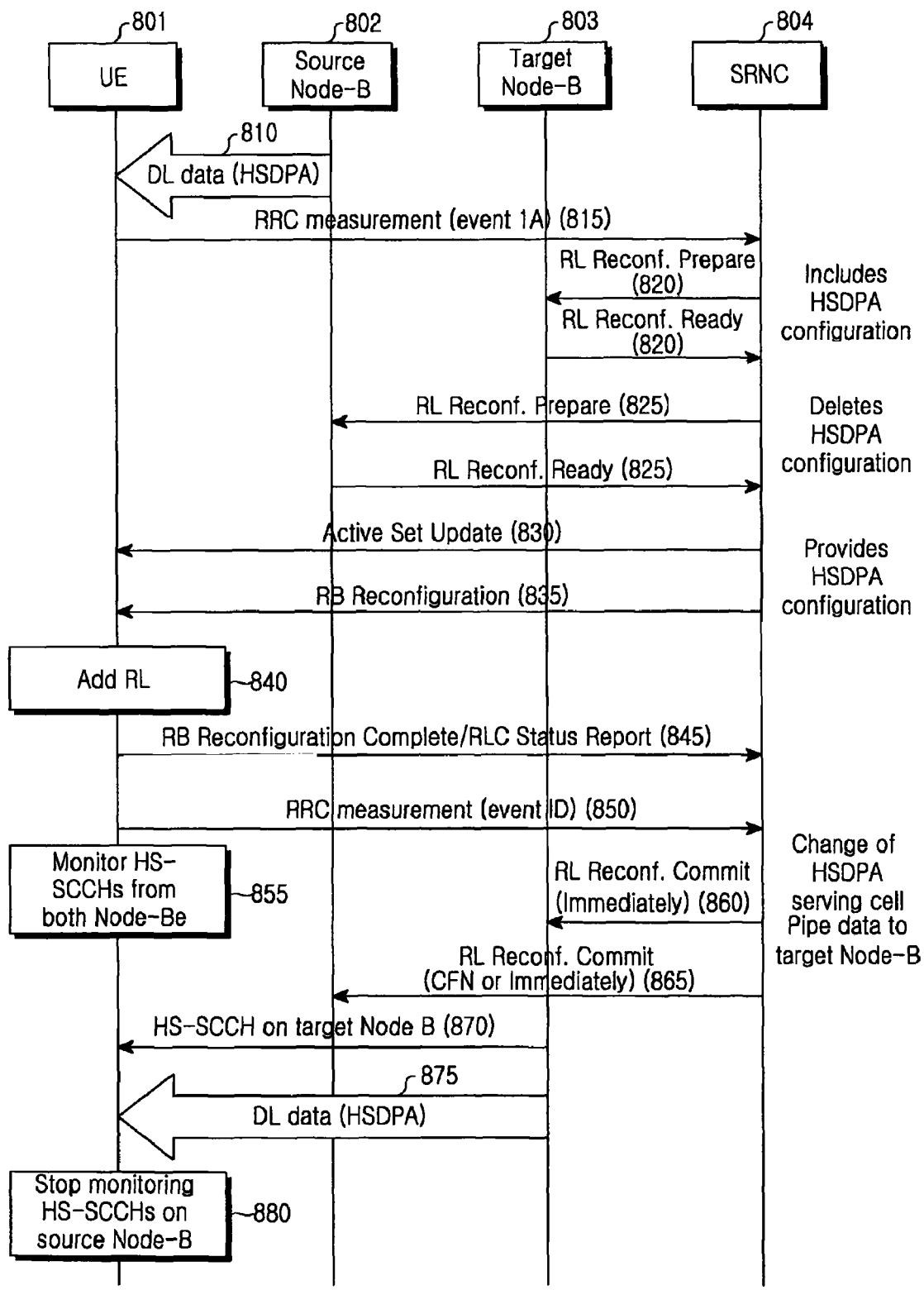
FIG. 8 is a signaling diagram according to a fourth exemplary embodiment of the present invention.

FIG. 8 is a signaling diagram according to a fourth exemplary embodiment of the present invention.

Referring to FIG. 8, a process in steps 810 to 845, which is a first aspect according to the fourth exemplary embodiment of the present invention, is a process of previously setting HSDPA configuration information in a target Node B before an HSDPA serving cell is actually changed, and then providing the information to a UE. In this aspect, the fourth embodiment is different from the first embodiment in that while the first embodiment uses RL RECONFIGURATION REQUEST/RESPONSE, which is the Asynchronous Radio Link Reconfiguration procedure, in step 220, the fourth embodiment uses RL RECONFIGURATION PREPARE/READY which is the Synchronous Radio Link Reconfiguration procedure.

A process in steps 850 to 880, which is a second aspect of the fourth exemplary embodiment of the present invention, is a process in which upon recognizing the change in the best cell, an SRNC 804 notifies this fact to a target Node B 803 and a source Node B 802, thereby to change the HSDPA serving cell. The target Node B 803 schedules actual data to the UE 801 through an HSDPA channel using the HSDPA configuration information previously set in the first aspect.

In this process, when the SRNC 804 notifies each Node B that HSDPA scheduling should be performed in the target Node B 803 due to the change in the best cell in steps 860 and 865, a new radio link configuration can be directly applied because the CFN that should necessarily be specified in the RL RECONFIGURATION COMMIT message used in the existing Synchronous Radio Link Reconfiguration procedure is not specified. The other steps of the fourth embodiment are equal to the corresponding steps of the first embodiment, so a description thereof will be omitted.

Table 4 and Table 5 show exemplary RL RECONFIGURATION COMMIT messages that can be used in steps 860 and 865 of the fourth exemplary embodiment of the present invention. In Table 4, CNF is changed to an optional value, and if the CFN is not included in this message, the modified configuration will be immediately committed. In Table 5, as another example of the RADIO LINK RECONFIGURATION COMMIT, a new "Immediate flag" field is added to the message, and if the "Immediate flag" field is included in the message, the modified configuration will be directly committed, ignoring the CFN.

TABLE 4

| IE/<br>Group Name | Pres-<br>ence | Range | IE Type<br>and Ref-<br>erence | Seman-<br>tics De-<br>scription | Criticality | Assigned<br>Critical-<br>ity |
|---|---|---|---|---|---|---|
| Message Discriminator | M | | | | — | |
| Message type | M | | | | YES | ignore |
| Transaction ID | M | | | | — | |
| Node B Communication Context ID | M | | | The reserved value "All NBCC" shall not be used. | YES | ignore |
| CFN | 0 | | | | YES | ignore |
| Active Pattern Sequence Information | 0 | | | FDD only | YES | ignore |

TABLE 5

| IE/<br>Group Name | Pres-<br>ence | Range | IE Type<br>and Ref-<br>erence | Seman-<br>tics De-<br>scription | Criticality | Assigned<br>Critical-<br>ity |
|---|---|---|---|---|---|---|
| Message Discriminator | M | | | | — | |
| Message type | M | | | | YES | ignore |
| Transaction ID | M | | | | — | |
| Node B Communication Context ID | M | | | The reserved value "All NBCC" shall not be used. | YES | ignore |
| CFN | M | | | | YES | ignore |
| Active Pattern Sequence Information | 0 | | | FDD only | YES | ignore |
| Immediate flag | 0 | | 1 bit | | YES | ignore |

Fifth Exemplary Embodiment

A fifth exemplary embodiment of the present invention, similar to the fourth embodiment, provides a method in which after an SRNC sends HSDPA-related radio link configuration information of a target cell to a Node B using a Synchronous Radio Link Reconfiguration procedure, the Node B starts HSDPA scheduling beginning at the receipt of an RL RECONFIGURATION COMMIT message from the SRNC. Here, unlike the existing Synchronous Radio Link Reconfiguration procedure, the new Synchronous Radio Link Reconfiguration procedure does not include CFN in the RL RECONFIGURATION COMMIT message in the fifth embodiment. Upon receipt of the RL RECONFIGURATION COMMIT message with no CNF, the Node B can immediately commit the new configuration received and stored from the RL RECONFIGURATION PREPARE message. The fifth embodiment is different from the fourth embodiment in that it uses the existing Asynchronous Radio Link Reconfiguration procedure after the change in the best cell, instead of previously notifying the HSDPA scheduling stop to the source cell, as a method for stopping the HSDPA scheduling of the source cell.

Figure 9:
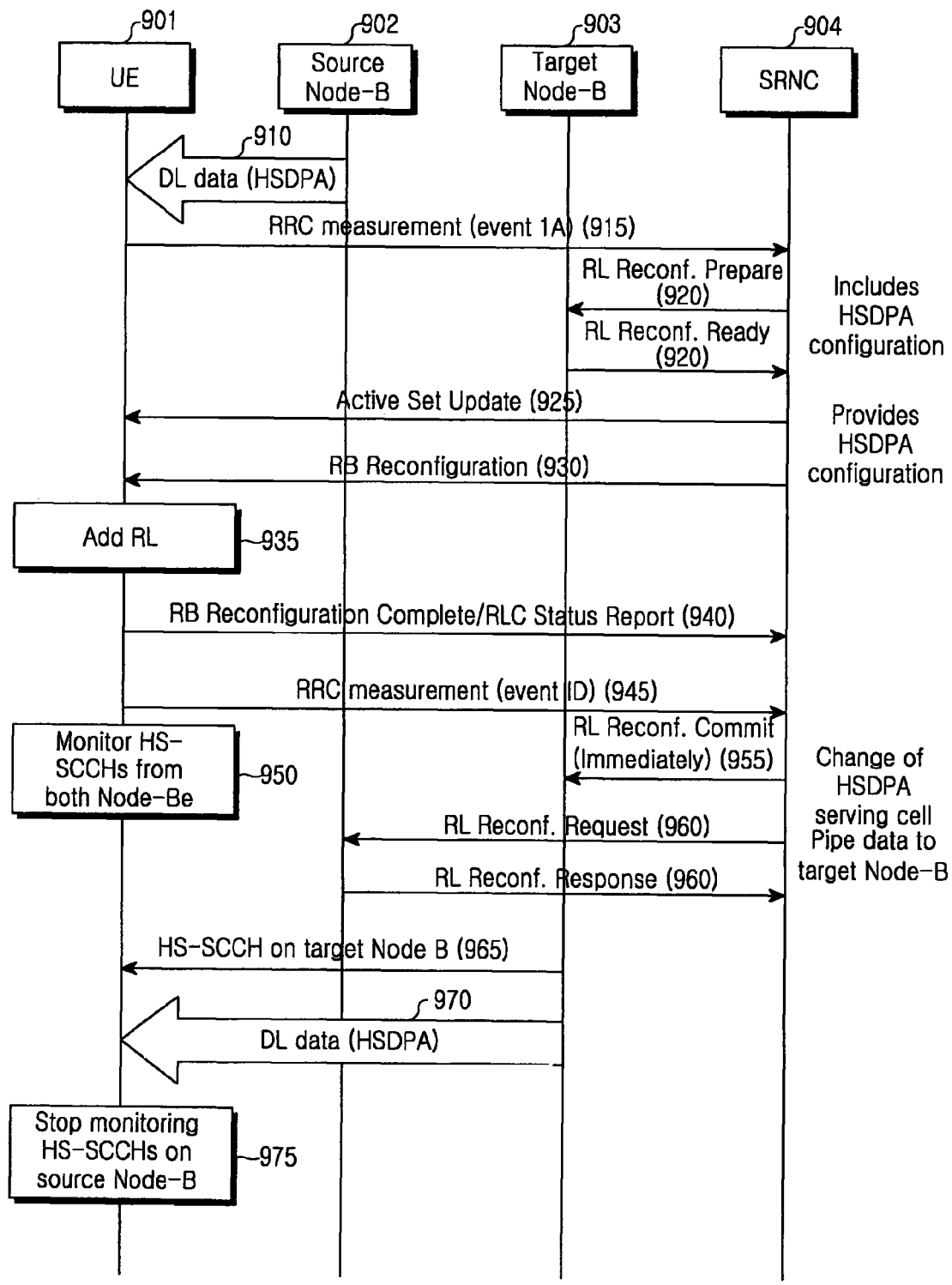
FIG. 9 is a signaling diagram according to a fifth exemplary embodiment of the present invention.

FIG. 9 is a signaling diagram according to a fifth exemplary embodiment of the present invention.

Referring to FIG. 9, a process in steps 910 to 940, which is a first aspect according to the fifth exemplary embodiment of the present invention, is a process of previously setting HSDPA configuration information in a target Node B before an HSDPA serving cell is actually changed, and then providing the information to a UE. In this aspect, the fifth embodiment is different from the fourth embodiment in that the process in step 825 of the fourth embodiment is not performed in the fifth embodiment. That is, while the fourth embodiment previously notifies the stop of HSDPA scheduling even to the source Node B 802 before the change in the best cell in preparation for the expected change in the serving cell in step 825, the fifth embodiment omits this process.

A process in steps 945 and 975, which is a second aspect according to the fifth exemplary embodiment of the present invention, is a process in which upon recognizing the change in the best cell, an SRNC 904 notifies this fact to a target Node B 903 and a source Node B 902, thereby to change the HSDPA serving cell. The target Node B 903 schedules actual data to the UE 901 through an HSDPA channel using the HSDPA configuration information previously set in the first aspect. In this process, when the SRNC 904 notifies the target Node B 903 that HSDPA scheduling should be performed in the target Node B 903 due to the change in the best cell in step 955, a new radio link configuration can be directly applied because the CFN that should necessarily be specified in the RL RECONFIGURATION COMMIT message used in the existing Synchronous Radio Link Reconfiguration procedure is not specified.

In this process, the fifth embodiment is different from the fourth embodiment in that the fourth embodiment sends an RL RECONFIGURATION COMMIT message indicating when it will commit the HSDPA scheduling stop previously notified through the Synchronous Radio Link Reconfiguration procedure in step 865, to the source Node B 802 in the first aspect, the fifth embodiment notifies the HSDPA scheduling stop using the Asynchronous Radio Link Reconfiguration procedure in step 960.

Upon receipt of the RL RECONFIGURATION REQUEST message in step 960, the source Node B 902 stops the HSDPA scheduling. The operations of the target Node B 903 and the UE 901 in the fifth embodiment are equal to those in the fourth embodiment, so a description thereof will be omitted.

Table 4 and Table 5 described in the fourth embodiment can be equally used even in step 955 of the fifth exemplary embodiment of the present invention.

Sixth Exemplary Embodiment

A sixth exemplary embodiment of the present invention, similar to the fourth and fifth embodiments, provides a method in which after an SRNC sends HSDPA-related radio link configuration information of a target cell to a Node B using a Synchronous Radio Link Reconfiguration procedure, the Node B starts HSDPA scheduling beginning at the receipt of an RL RECONFIGURATION COMMIT message from the SRNC. Here, unlike the existing Synchronous Radio Link Reconfiguration procedure, the new Synchronous Radio Link Reconfiguration procedure does not include CFN in the RL RECONFIGURATION COMMIT message in the sixth embodiment.

Upon receipt of the RL RECONFIGURATION COMMIT message with no CNF, the Node B can immediately commit the new configuration received and stored from the RL RECONFIGURATION PREPARE message. The sixth embodiment, like the fifth embodiment, sends a message for requesting the stop of the HSDPA scheduling after the change in the best cell, instead of previously notifying the HSDPA scheduling stop to the source cell, as a method for stopping the HSDPA scheduling of the source cell. Unlike the fifth embodiment, the sixth embodiment uses the HSDPA COMMIT message used in step 760 of the third embodiment, without using the Synchronous or Asynchronous Radio Link Reconfiguration procedure in the source cell.

Figure 10:
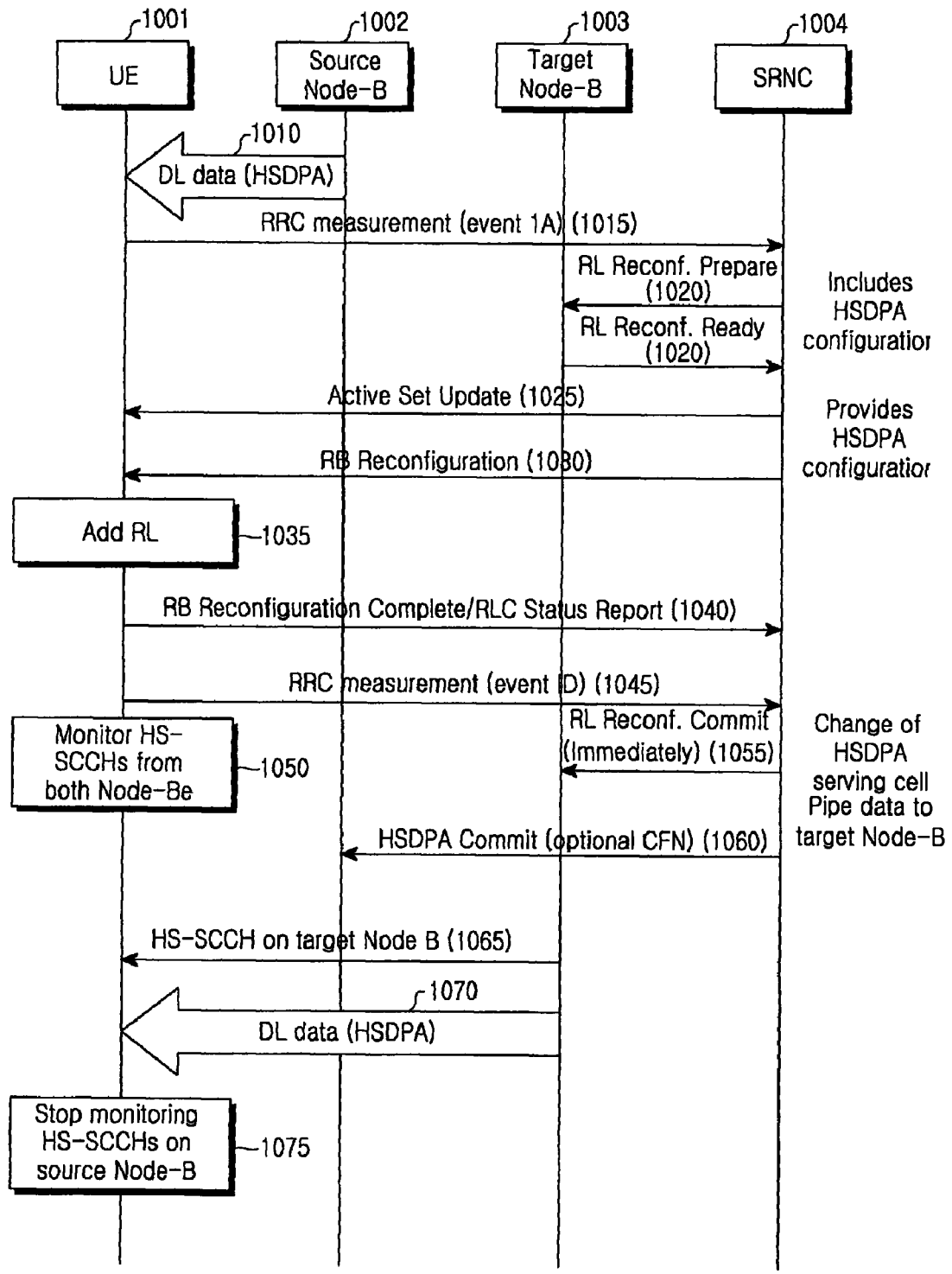
FIG. 10 is a signaling diagram according to a sixth exemplary embodiment of the present invention.

FIG. 10 is a signaling diagram according to a sixth exemplary embodiment of the present invention.

Referring to FIG. 10, a process in steps 1010 to 1040, which is a first aspect according to the sixth exemplary embodiment of the present invention, is a process of previously setting HSDPA configuration information in a target Node B 1003 before an HSDPA serving cell is actually changed, and then providing the information to a UE 1001. This aspect is equal to that in the fifth embodiment.

A process in steps 1045 to 1075, which is a second aspect according to the sixth exemplary embodiment of the present invention, is a process in which upon recognizing the change in the best cell, an SRNC 1004 notifies this fact to a target Node B 1003 and a source Node B 1002, thereby to change the HSDPA serving cell. The target Node B 1003 schedules actual data to the UE 1001 through an HSDPA channel using the HSDPA configuration information previously set in the first aspect. In this process, when the SRNC 1004 notifies the target Node B 1003 that HSDPA scheduling should be performed in the target Node B 1003 due to the change in the best cell in step 1055, a new radio link configuration can be directly applied because the CFN that should necessarily be specified in the RL RECONFIGURATION COMMIT message used in the existing Synchronous Radio Link Reconfiguration procedure is not specified.

In this process, the sixth embodiment is different from the fifth embodiment in that while the fifth embodiment notifies the stop of the HSDPA scheduling using the Asynchronous Radio Link Reconfiguration procedure in step 960, the message sent to the source Node B 1002 in step 1060 of the sixth embodiment is the HSDPA COMMIT message used in step 760 of the third embodiment.

Upon receipt of the HSDPA COMMIT message in step 1060, the source Node B 1002 stops the HSDPA scheduling. The operations of the target Node B 1003 and the UE 1001 in the sixth embodiment are equal to those in the fourth and fifth embodiments, so a description thereof will be omitted. For reference, because the HSDPA COMMIT message used in step 1060 optionally has a separate CFN field as shown in Table 3, the source cell can stop the HSDPA scheduling after a lapse of a predetermined time.

Table 4 and Table 5 described in the fourth embodiment can be equally used even in step 1055 of the sixth exemplary embodiment of the present invention.

As can be understood from the foregoing description, exemplary implementation of certain embodiments of the present invention can change the HSDPA serving cell soon after the change in the best cell, thereby facilitating better utilization of radio resources.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method performed by a radio network controller (RNC) for controlling a change in base station performing scheduling a packet data service of a terminal from a source base station to a target base station when a serving cell for the packet data service changes from a source cell controlled by the source base station to a target cell controlled by the target base station, the method comprising:

receiving from the terminal information indicating that the target cell should be added to an active set;

in response to the information indicating that the target cell should be added to the active set and before receiving from the terminal any information indicating that the target cell has become a best cell, preparing the target base station and the terminal to configure for a potential packet data service served by the target base station, the preparing operation including:

transmitting to the target base station configuration information for the potential packet data service, so as to allow the target base station to configure for the potential packet data service;

transmitting to the terminal configuration information for the potential packet data service and a request message requesting the terminal to update the active set and allowing the terminal to establish a radio link to the target base station; and receiving from the terminal a response message indicating a completion of setting of configuration for the potential packet data service using the configuration information for the packet data service transmitted to the terminal;

receiving from the terminal information on a change in best cell, the information on the change in best cell indicating that the target cell is a best cell; and in response to the information on the change in best cell, committing a change in serving cell for the packet data service of the terminal from the source cell to the target cell, the committing operation including:

transmitting to the target base station a message so as to allow the target base station to perform packet data service scheduling for the terminal based on the configuration information for the potential packet data service previously transmitted to the target base station; and transmitting to the source base station a message so as to allow the source base station to stop packet data service scheduling for the terminal.

2. The cell setting method of claim 1, wherein the allowing of the target base station to establish a radio link comprises performing the establishing according to an asynchronous radio link reconfiguration procedure comprising a radio link reconfiguration request being transmitted to the target base station by a serving radio network controller (RNC), a radio link reconfiguration response being transmitted to the serving RNC by the target base station, and a scheduling message being used for allowing the target base station to perform packet data service scheduling for the terminal.

3. The cell setting method of claim 2, wherein the allowing of the target base station to perform packet data service scheduling comprises transmitting, by the serving RNC, at least one of a Node B Application Part (NBAP) and Radio Network System Application Part (RNSAP) message for commanding the target base station to perform the scheduling.

4. The cell setting method of claim 2, wherein the allowing of the target base station to establish a radio link comprises the serving RNC notifying expected deletion of the configuration information for the packet data service to the source base station in advance of the establishment of the radio link; and wherein the allowing of the source base station to stop the packet data service scheduling for the terminal comprises commanding, by the serving RNC, the source base station to delete the configuration information for the packet data service thereby to stop the scheduling of the source base station.

5. The cell setting method of claim 2, wherein the allowing of the source base station to stop the packet data service scheduling for the terminal comprises performing the stopping according to an asynchronous radio link reconfiguration procedure comprising a radio link reconfiguration request being transmitted to the source base station by a serving RNC, a radio link reconfiguration response being transmitted to the serving RNC by the target base station, and a scheduling message being used for allowing the source base station to stop the packet data service scheduling for the terminal.

6. The cell setting method of claim 2, wherein the allowing of the source base station to stop the packet data service scheduling for the terminal comprises transmitting, by the serving RNC, a Node B Application Part (NBAP) or Radio Network System Application Part (RNSAP) message for commanding the source base station to stop the scheduling.

7. The cell setting method of claim 1, wherein the allowing the target base station to establish a radio link and the step of allowing the target base station to perform packet data service scheduling are performed according to a synchronous radio link reconfiguration procedure.

8. The cell setting method of claim 7, wherein the allowing of the target base station to perform packet data service scheduling comprises transmitting, by the serving RNC, a radio link reconfiguration commit message with no Connection Frame Number (CFN) to the target base station.

9. The cell setting method of claim 7, wherein the allowing of the target base station to establish a radio link comprises the serving RNC notifying expected deletion of the configuration information for the packet data service to the source base station in advance of the establishment of the radio link; and wherein the allowing of a source base station to stop the packet data service scheduling for the terminal comprises commanding, by the serving RNC, the source base station to delete the configuration information for the packet data service thereby to stop the scheduling of the source base station.

10. The cell setting method of claim 7, wherein the allowing of the source base station to stop the packet data service scheduling for the terminal comprises performing the stopping according to an asynchronous radio link reconfiguration procedure comprising a radio link reconfiguration request being transmitted to the source base station by a serving RNC, a radio link reconfiguration response being transmitted to the serving RNC by the target base station, and a scheduling message being used for allowing the source base station to stop the packet data service scheduling for the terminal.

11. The cell setting method of claim 7, wherein the allowing of the source base station to stop the packet data service scheduling for the terminal comprises transmitting, by the serving RNC, an NBAP or RNSAP message for commanding the source base station to stop the scheduling.

12. A method for receiving by a terminal a packet data service subject to scheduling performed in a serving cell for the packet data service when the serving cell for the packet data service changes from a source cell controlled by a source base station to a target cell controlled by a target base station, the method comprising:

transmitting information indicating that the target cell should be added to an active set;

as part of an preparing operation controlled by a serving radio network controller (RNC) to prepare the target base station and the terminal to configure a potential packet data service served by the target base station, updating the active set and re-setting configuration for the potential packet data service using configuration information received from the serving RNC, and transmitting a response message indicating a completion of the re-setting of the configuration for the potential packet data service;

transmitting information on a change in best cell to the serving RNC, the information on the change in best cell indicating that the target cell is a best cell; and as part of a committing operation controlled by the serving RNC to commit a change in serving cell for the packet data service from the source cell to the target cell, simultaneously monitoring scheduling information for the packet data service received from both the source base station and the target base station; and receiving a packet data service from the target base station based on the previously re-set configuration information for the potential packet data service, after the target base station performs scheduling on the packet data service;

wherein the preparing operation is performed before the transmitting of information on a change in best call, and further comprises:

transmitting, by the serving RNC, to the target base station configuration information for the potential packet data service, so as to allow the target base station to configure for the potential packet data service; and transmitting, by the serving RNC, to the terminal the configuration information for the potential packet data service used by the re-setting of the configuration for the packet data service, and a request message requesting the terminal to update the active set and allowing the terminal to establish a radio link to the target base station;

wherein the committing operation is performed in response to the information on the change in best call, and further comprises:

transmitting, by the serving RNC, to the target base station a message so as to allow the target base station to perform packet data service scheduling for the terminal based on the configuration information for the potential packet data service previously transmitted to the target base station; and transmitting, by the serving RNC, to the source base station a message so as to allow the source base station to stop packet data service scheduling for the terminal.

13. The method of claim 12, wherein, as part of the preparing operation controlled by the serving RNC, the target base station establishes a radio link before the re-setting of configuration information for the packet data service.

14. The method of claim 13, wherein the setup of the radio link by target base station is performed according to an asynchronous radio link reconfiguration procedure comprising a radio link reconfiguration request being transmitted to the target base station by the serving RNC, a radio link reconfiguration response being transmitted to the serving RNC by the target base station, and a scheduling message being used for allowing the target base station to perform packet data service scheduling for the terminal.

15. The method of claim 14, wherein the packet data service scheduling by the target base station comprises transmitting, by the serving RNC, a Node B Application Part (NBAP) or Radio Network System Application Part (RNSAP) message for commanding the target base station to perform the scheduling.

16. The method of claim 14, wherein the source base station stops the packet data service scheduling according to control of the serving RNC, before the step of receiving, by the terminal, the packet data service from the target base station.

17. The method of claim 16, wherein the serving RNC notifies expected deletion of the configuration information for the packet data service to the source base station after the terminal transmits the information on the cell to be added to the active set to the serving RNC and in advance of the establishment of the radio link; and wherein the serving RNC commands the source base station to delete the configuration information for the packet data service thereby to stop the scheduling of the source base station, after the transmitting, by the terminal, the information on the change in best cell to the serving RNC.

18. The method of claim 16, wherein the stopping of the packet data service scheduling by the source base station comprises performing the stopping according to an asynchronous radio link reconfiguration procedure comprising a radio link reconfiguration request being transmitted to the target base station by the serving RNC, a radio link reconfiguration response being transmitted to the serving RNC by the target base station, and a scheduling message being used for allowing the source base station to stop the packet data service scheduling for the terminal.

19. The method of claim 16, wherein the serving RNC transmits an NBAP or RNSAP message for commanding the source base station to stop the scheduling, thereby to stop the packet data service scheduling of the source base station.

20. The method of claim 13, wherein the setup of a radio link by the target base station and the packet data service scheduling by the target base station are performed according to a synchronous radio link reconfiguration procedure.

21. The method of claim 20, wherein the serving RNC transmits a radio link reconfiguration commit message with no Connection Frame Number (CFN) to the target base station thereby to control the packet data service scheduling of the target base station.

22. The method of claim 20, wherein the serving RNC notifies expected deletion of the configuration information for the packet data service to the source base station after the terminal transmits the information on the cell to be added to the active set to the serving RNC and in advance of the establishment of the radio link; and
  wherein the serving RNC commands the source base station to delete the configuration information for the packet data service thereby to stop the scheduling of the source base station, after the transmitting, by the terminal, the information on the change in the best cell to the serving RNC.

23. The method of claim 20, wherein the stopping of the packet data service scheduling by the source base station comprises performing the stopping according to an asynchronous radio link reconfiguration procedure comprising a radio link reconfiguration request being transmitted to the target base station by the serving RNC, a radio link reconfiguration response being transmitted to the serving RNC by the target base station, and a scheduling message being used for allowing the source base station to stop the packet data service scheduling for the terminal.

24. The method of claim 20, wherein the serving RNC transmits an NBAP or RNSAP message for commanding the source base station to stop the scheduling, thereby to stop the packet data service scheduling of the source base station.

25. An apparatus for controlling a change in base station performing scheduling a packet data service of a terminal from a source base station to a target base station when a serving cell for the packet data service changes from a source cell controlled by the source base station to a target cell controlled by the target base station, the apparatus comprising:
  a signaling receiver for first receiving from the terminal information indicating that the target cell should be added to an active set, and later receiving from the terminal information on a change in best cell, the information on the change in best cell indicating that the target base station is a best cell;
  a signaling transmitter for, in response to the received information indicating that the target cell should be added to the active set and before receiving the information on the change in best cell, as part of an preparing operation controlled by the apparatus to prepare the target base station and the terminal to configure a potential packet data service served by the target base station, transmitting to the target base station configuration information for the potential packet data service so as to allow the target base station to configure for the potential packet data service, and transmitting to the terminal configuration information for the potential packet data service, and a request message requesting the terminal to update the active set and allowing the terminal to establish a radio link to the target base station;
  a memory for storing information on the active set; and
  a data path decision unit for, as part of the preparing operation, allowing the terminal to update the active set and set the configuration for the potential packet data service using the configuration information for the potential packet data service transmitted to the terminal, and as part of a committing operation controlled by the apparatus to commit a change in serving cell for the packet data service from the source cell to the target cell in response to the received information on the change in best cell, allowing the target base station to perform packet data service scheduling for the terminal based on the configuration information for the potential packet data service previously transmitted to the target base station;
  wherein the preparing operation further comprises:
    receiving, by the apparatus, from the terminal a response message indicating a completion of the setting of the configuration for the potential packet data service using the configuration information for the packet data service transmitted to the terminal;
  wherein the committing operation is performed in response to the information on the change in best call, and further comprises:
    transmitting, by the signaling transmitter, to the target base station a message so as to allow the target base station to perform packet data service scheduling for the terminal based on the configuration information for the potential packet data service previously transmitted to the target base station; and
    transmitting, by the signaling transmitter, to the source base station a message so as to allow the source base station to stop packet data service scheduling for the terminal.

26. The cell setting apparatus of claim 25, wherein the data path decision unit controls the setup of a radio link by the target base station according to an asynchronous radio link reconfiguration procedure comprising a radio link reconfiguration request being transmitted to the target base station, a radio link reconfiguration response being received from the target base station, and a scheduling message being used for allowing the target base station to perform packet data service scheduling for the terminal.

27. The cell setting apparatus of claim 25, wherein the data path decision unit controls the radio link setup and the packet data service scheduling for the target base station according to a synchronous radio link reconfiguration procedure.

28. The cell setting apparatus of claim 27, wherein the data path decision unit transmits a radio link reconfiguration commit message with no Connection Frame Number (CFN) to the target base station thereby to control the packet data service scheduling of the target base station.

29. An apparatus for receiving a packet data service subject to scheduling performed in a serving cell for the packet data service when the serving cell for the packet data service changes from a source cell controlled by a source base station to a target cell controlled by a target base station, the apparatus comprising:
  a signaling receiver for first generating information indicating that the target cell should be added to an active set and later generating information on a change in best cell with the information on the change in best cell indicating that the target cell is a best cell, and as part of a committing operation controlled by a serving radio network controller (RNC) to commit a change in serving cell for the packet data service from the source cell to the target cell, simultaneously monitoring scheduling information for the packet data service from both the source base station and the target base station;
  a signaling transmitter for first transmitting to the serving RNC the information indicating that the target cell should be added to the active set, then as part of an preparing operation controlled by the serving RNC to prepare the target base station and the apparatus to configure the potential packet data service, transmitting to the serving RNC a response message indicating a completion of re-setting of configuration for the potential packet data service using configuration information for the potential packet data service received from the serving RNC, and later transmitting to the serving RNC the information on a change in best cell; and a memory for, as part of the preparing operation controlled by the serving RNC, updating the active set, and storing the received configuration information for the potential packet data service;

wherein the signaling receiver receives the packet data service from the target base station, after the target base station performs scheduling on the packet data service, based on the configuration information for the potential packet data service received from the serving RNC;

wherein the preparing operation is performed before the transmitting of the information on the change in best call, and further comprises:

transmitting, by the serving RNC, to the target base station configuration information for the potential packet data service, so as to allow the target base station to configure for the potential packet data service; and transmitting, by the serving RNC, to the apparatus the configuration information for the potential packet data service used by the re-setting of the configuration for the potential packet data service, and a request message requesting the apparatus to update the active set and allowing the apparatus to establish a radio link to the target base station;

wherein the committing operation is performed after the transmitting of the information on the change in best call, and further comprises:

transmitting, by the serving RNC, to the target base station a message so as to allow the target base station to perform packet data service scheduling for the apparatus based on the configuration information for the potential packet data service previously transmitted to the target base station; and transmitting, by the serving RNC, to the source base station a message so as to allow the source base station to stop packet data service scheduling for the apparatus.

30. The apparatus of claim 29, wherein the serving RNC controls the scheduling of the target base station according to an asynchronous radio link reconfiguration procedure comprising a radio link reconfiguration request being transmitted to the target base station, a radio link reconfiguration response being received from the target base station, and a scheduling message being used for allowing the target base station to perform packet data service scheduling for the terminal.

31. The apparatus of claim 29, wherein the serving RNC controls the radio link setup and the packet data service scheduling for the target base station according to a synchronous radio link reconfiguration procedure.

32. The apparatus of claim 31, wherein the serving RNC transmits a radio link reconfiguration commit message with no Connection Frame Number (CFN) to the target base station thereby to control the packet data service scheduling of the target base station.

* * * * *